(12) United States Patent
Ikeda et al.

(10) Patent No.: US 9,722,218 B2
(45) Date of Patent: Aug. 1, 2017

(54) WELDED STRUCTURE IN BATTERY, FORMING METHOD OF THE SAME, SECONDARY BATTERY CELL AND SECONDARY BATTERY MODULE

(75) Inventors: Kohtaro Ikeda, Hitachinaka (JP); Eiichi Isono, Hitachinaka (JP); Shin Onose, Hitachinaka (JP); Hayato Koguchi, Hitachinaka (JP)

(73) Assignee: HITACHI AUTOMOTIVE SYSTEMS, LTD., Hitachinaka-Shi, Ibaraki (JP)

( * ) Notice: Subject to any disclaimer, the term of this patent is extended or adjusted under 35 U.S.C. 154(b) by 289 days.

(21) Appl. No.: 14/366,958

(22) PCT Filed: Dec. 19, 2011

(86) PCT No.: PCT/JP2011/079398
§ 371 (c)(1),
(2), (4) Date: Jun. 19, 2014

(87) PCT Pub. No.: WO2013/094000
PCT Pub. Date: Jun. 27, 2013

(65) Prior Publication Data
US 2014/0349148 A1 Nov. 27, 2014

(51) Int. Cl.
*H01M 2/04* (2006.01)
*H01M 2/22* (2006.01)
(Continued)

(52) U.S. Cl.
CPC ......... *H01M 2/0434* (2013.01); *H01M 2/046* (2013.01); *H01M 2/0413* (2013.01);
(Continued)

(58) Field of Classification Search
CPC .... H01M 2/0434; H01M 2/12; H01M 2/0491; H01M 2/0426; H01M 2/0413;
(Continued)

(56) References Cited

U.S. PATENT DOCUMENTS

2006/0275657 A1 12/2006 Kozuki et al.
2009/0297892 A1 12/2009 Ijaz et al.

FOREIGN PATENT DOCUMENTS

CN 2013-97833 2/2010
JP 2000-036299 A 2/2000
(Continued)

OTHER PUBLICATIONS

English Translation of JP2003-187773.*
English Translation of JP2009-266782.*

*Primary Examiner* — Patrick Ryan
*Assistant Examiner* — Kiran Akhtar
(74) *Attorney, Agent, or Firm* — Volpe and Koenig, P.C.

(57) ABSTRACT

A plating layer 4 is formed on a surface of a battery cover 3, and a peripheral edge part 37b of a cover case 37 is arranged on an upper surface of the plating layer 4. A welding part 40 is formed at a tip part of the peripheral edge part 37b. The welding part 40 includes a melted part 41 in which the tip of the peripheral edge part 37b is melted, and an elution part 42 flowing from the tip onto the plating layer 4, and the melted part 41 and the elution part 42 are welded to the plating layer 4 in the upper surface of the plating layer 4.

5 Claims, 11 Drawing Sheets

(51) Int. Cl.
*H01M 2/10* (2006.01)
*H01M 2/12* (2006.01)

(52) U.S. Cl.
CPC ....... *H01M 2/0426* (2013.01); *H01M 2/0439* (2013.01); *H01M 2/0478* (2013.01); *H01M 2/0491* (2013.01); *H01M 2/1072* (2013.01); *H01M 2/22* (2013.01); *H01M 2/1241* (2013.01); *H01M 2200/20* (2013.01); *H01M 2200/30* (2013.01); *Y10T 29/4911* (2015.01)

(58) Field of Classification Search
CPC .. H01M 2/1072; H01M 2/0439; H01M 2/046; H01M 2/0478; H01M 2/22; H01M 2/1241
See application file for complete search history.

(56) References Cited

FOREIGN PATENT DOCUMENTS

| | | | | |
|---|---|---|---|---|
| JP | 2002-246004 A | 8/2002 | | |
| JP | 2003-187773 | * 7/2003 | ............. | H01M 2/12 |
| JP | 2003-187773 A | 7/2003 | | |
| JP | 2006-351512 A | 12/2006 | | |
| JP | 2007-213819 A | 8/2007 | | |
| JP | 2009-266782 | * 11/2009 | ............. | H01M 2/12 |
| JP | 2009-266782 A | 11/2009 | | |
| JP | 2011-521403 A | 7/2011 | | |

* cited by examiner

WELDED STRUCTURE IN BATTERY, FORMING METHOD OF THE SAME, SECONDARY BATTERY CELL AND SECONDARY BATTERY MODULE

TECHNICAL FIELD

The present invention relates to a welded structure in a battery, which is constructed by welding conductive metal members forming a current path in a secondary battery cell typified by a lithium ion secondary battery and a secondary battery module constructed of plural secondary battery cells, a forming method of the same, a secondary battery cell and a secondary battery module.

BACKGROUND ART

In recent years, a secondary battery module having high energy density is developed as a power source of an electric vehicle or the like. Especially for on-board use, since loads from various directions are expected, and a large current flows, connection between metal members as a current path is required to have strength and to be reduced in electrical resistance.

For example, a cylindrical secondary battery is formed to have a sealed structure by housing a power generation element in a battery case of a tubular shape having a bottom, by injecting electrolyte and by sealing the opening of the battery case with a battery cover. The power generation element includes positive and negative electrodes, and for example, the positive electrode is electrically connected to the battery cover. A safety valve unit integrated with the battery cover by caulking or the like is provided between the positive electrode and the battery cover. The battery cover and the safety valve unit are caulked to a peripheral edge part of an opening provided at one end side of the battery case through a gasket.

The battery cover is made of, for example, stainless, and the safety valve unit is made of, for example, aluminum.

A method is known in which in order to increase the strength of joining between the battery cover and the safety value unit and to reduce the electrical resistance, a laser is irradiated to an end of the safety valve unit, and the safety valve unit is welded to the battery cover (see, for example, PTL 1). This prior art literature discloses that the safety valve unit is melted by the laser irradiation, and flowing aluminum-based metal and iron-based metal are fused and are firmly joined.

CITATION LIST

Patent Literature

PTL 1: JP-A-2003-187773

SUMMARY OF INVENTION

Technical Problem

The prior art literature discloses that the aluminum-based metal and iron-based metal are fused and are firmly joined. However, when metal members different in material are welded, securing of joining strength and reduction of electrical resistance are insufficient due to a difference in melting point of both the members. Besides, there is a fear that crack occurs in the welded part.

Solution to Problem

A welded structure in a battery according to a first aspect of the invention includes a first conductive metal member, a metal layer provided on the first conductive metal member, and a second conductive metal member made of a material different from that of the first conductive metal member, the first conductive metal member and the second conductive metal member are joined through the metal layer, and a charge and discharge current flows, in which at least apart of a tip part of the second conductive metal member is provided with a melted part in which a tip is melted and an elution part flowing from the tip onto the metal layer, and the melted part and the elution part are welded to the metal layer in a surface of the metal layer.

A welded structure in a battery according to a second aspect of the invention is preferably such that the metal layer is made of a material in which a joining force to the first conductive metal member by welding is higher than that to the second conductive metal member.

A welded structure in a battery according to a third aspect of the invention is preferably such that in the welded structure in the battery, the first conductive metal member is made of one of iron, copper, iron alloy and copper alloy, and the second conductive metal member is made of one of aluminum, copper, tin, aluminum alloy, copper alloy and tin alloy.

A welded structure in a battery according to a fourth aspect of the invention is preferably such that in the welded structure in the battery, the metal layer is a plating layer provided on the first conductive metal member.

A welded structure in a battery according to a fifth aspect of the invention may be such that in the welded structure in the battery, the battery is a secondary battery cell including a power generation unit including positive and negative electrodes, a battery case in which an opening is formed at one end side and the power generation unit and an electrolyte are contained in an inside, a cover case connected to one of the positive and negative electrodes of the power generation unit, and a battery cover which is integrated with the cover case and on a surface of which a plating layer is formed, the first conductive metal member is the battery cover, the metal layer is the plating layer, and the second conductive metal member is the cover case.

A welded structure in a battery according to sixth aspect of the invention may be such that in the welded structure in the battery, the battery cover and the cover case have circular shapes in plan view, and the melted part and the elution part are provided at plural places intermittently along a periphery of the cover case.

A welded structure in a battery according to a seventh aspect of the invention may be such that in the welded structure in the battery, a cleavage valve is provided in the cover case.

A welded structure in a battery according to an eighth aspect of the invention may be such that in the welded structure in the battery, the battery cover has a hat-type shape including a peripheral edge part and a cylindrical part rising from the peripheral edge part, the cover case is arranged at an inner surface side of the peripheral edge part of the battery cover, and a tip of the cover case is welded to the plating layer at the inner surface side of the peripheral edge part of the battery cover.

A welded structure in a battery according to a ninth aspect of the invention may be such that in the welded structure in the battery, the battery cover has a hat-type shape including a peripheral edge part and a cylindrical part rising from the peripheral edge part, the cover case is arranged at an inner surface side of the peripheral edge part of the battery cover, the peripheral edge part of the cover case is folded from an inner surface side of the peripheral edge part of the battery cover to an outer surface side and is caulked, and a tip of the peripheral edge part of the cover case is welded to the plating layer at the outer surface side of the peripheral edge part of the battery cover.

A welded structure in a battery according to a tenth aspect of the invention is preferably such that in the welded structure in the battery, the battery cover includes plural openings provided in a head part of the cylindrical part along a circumferential direction, and one end and the other end of the melted part and the elution part of the cover case in the circumferential direction are provided at positions not corresponding to the openings.

A welded structure in a battery according to an eleventh aspect of the invention may be such that in the welded structure in the battery, a gasket is further included, and the battery cover and the cover case are caulked to the peripheral edge part of the opening of the battery case through the gasket.

A secondary battery cell according to a twelfth aspect of the invention includes the welded structure in the battery.

A welded structure in a battery according to a thirteenth aspect of the invention may be such that in the welded structure in the battery, the battery is a secondary battery module which includes plural secondary battery cells each including a battery case having an opening at one end side and containing a battery unit and an electrolyte, a battery cover attached to a peripheral edge part of the opening of the battery case and an electrode terminal member provided with a plating layer on at least an outer surface and provided on the battery cover through an insulation member, and a bus bar connecting the electrode terminal members of the adjacent secondary battery cells, the first conductive metal member is the electrode terminal member, the metal layer is the plating layer, and the second conductive metal member is the bus bar.

A welded structure in a battery according to a fourteenth aspect of the invention is preferably such that in the welded structure in the battery, the bus bar is formed into a rectangular plate shape having a front end surface, a rear end surface and a pair of side surfaces, and the melted part and the elution part are provided on the front end surface, the rear end surface and the pair of side surfaces of the bus bar.

A welded structure in a battery according to a fifteenth aspect of the invention is preferably such that in the welded structure in the battery, the bus bar, together with the electrode terminal member, is attached to the battery cover by a fastening member.

A secondary battery module according to a sixteenth aspect of the invention includes the welded structure in the battery.

A forming method of a welded structure in a battery according to a seventeenth aspect of the invention includes a first step of arranging a tip of a second conductive member made of a material different from that of a first conductive metal member on one surface of a metal layer provided on the first conductive metal member, and a second step in which the tip of the second conductive metal member is melted to form a melted part and an elution part flowing from the tip onto the one surface of the metal layer, and the melted part and the elution part are welded to the metal layer in the surface of the metal layer.

A forming method of a welded structure in a battery according to an eighteenth aspect of the invention is preferably such that in the forming method of the welded structure in the battery, the metal layer is made of a material in which a joining force to the first conductive metal member by welding is higher than that to the second conductive metal member.

A forming method of a welded structure in a battery according to a nineteenth aspect of the invention is preferably such that in the forming method of the welded structure in the battery, the first step includes a step of forming the metal layer on the first conductive metal member by plating.

A forming method of a welded structure in a battery according to a twentieth aspect of the invention is preferably such that in the forming method of the welded structure in the battery, the second step includes a laser spraying step of irradiating a laser to the tip of the second conductive metal member to provide the melted part and the elution part, and in the laser irradiation step, a center of a spot of the irradiated laser is positioned inside the tip of the second conductive metal member.

A forming method of a welded structure in a battery according to a twenty-first aspect of the invention is preferably such that in the forming method of the welded structure in the battery, the laser irradiation step is a step of providing the melted part and the elution part at the tip of the second conductive metal member by laser irradiation and annealing the metal layer.

A forming method of a welded structure in a battery according to a twenty-second aspect of the invention is preferably such that in the forming method of the welded structure in the battery, an irradiation angle of the laser irradiated to the second conductive member is inclined from a surface parallel to a tip surface of the second conductive member toward an outside direction of the tip surface, and is 20 degrees or less from the surface parallel to the tip surface.

Advantageous Effects of Invention

The melted part in which the tip is melted and the elution part flowing from the tip onto the metal layer are formed at the tip side of the second conductive metal member, and the melted part and the elution part are welded to the metal layer in the surface of the metal layer provided on the first conductive metal member.

Thus, the welded structure having low electrical resistance, high bonding force and high reliability can be obtained.

DESCRIPTION OF EMBODIMENTS

Embodiment 1

Hereinafter, an embodiment of a welded structure in a battery according to the invention will be described with reference to FIG. 1 to FIG. 5.

Figure 1:
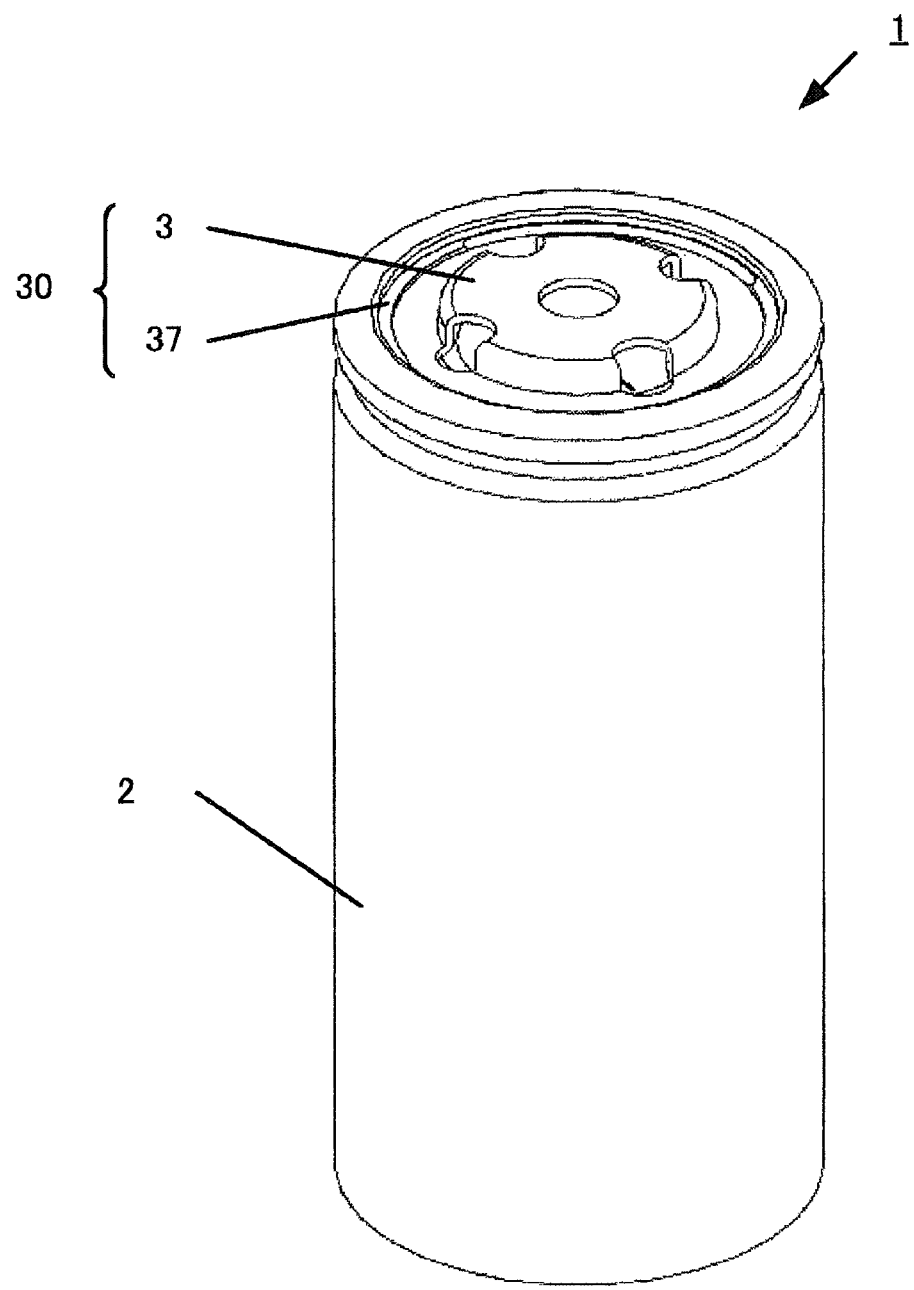
FIG. 1 is an outer appearance perspective view of a secondary battery cell as an embodiment of a welded structure in a battery according to the invention.
Figure 2:
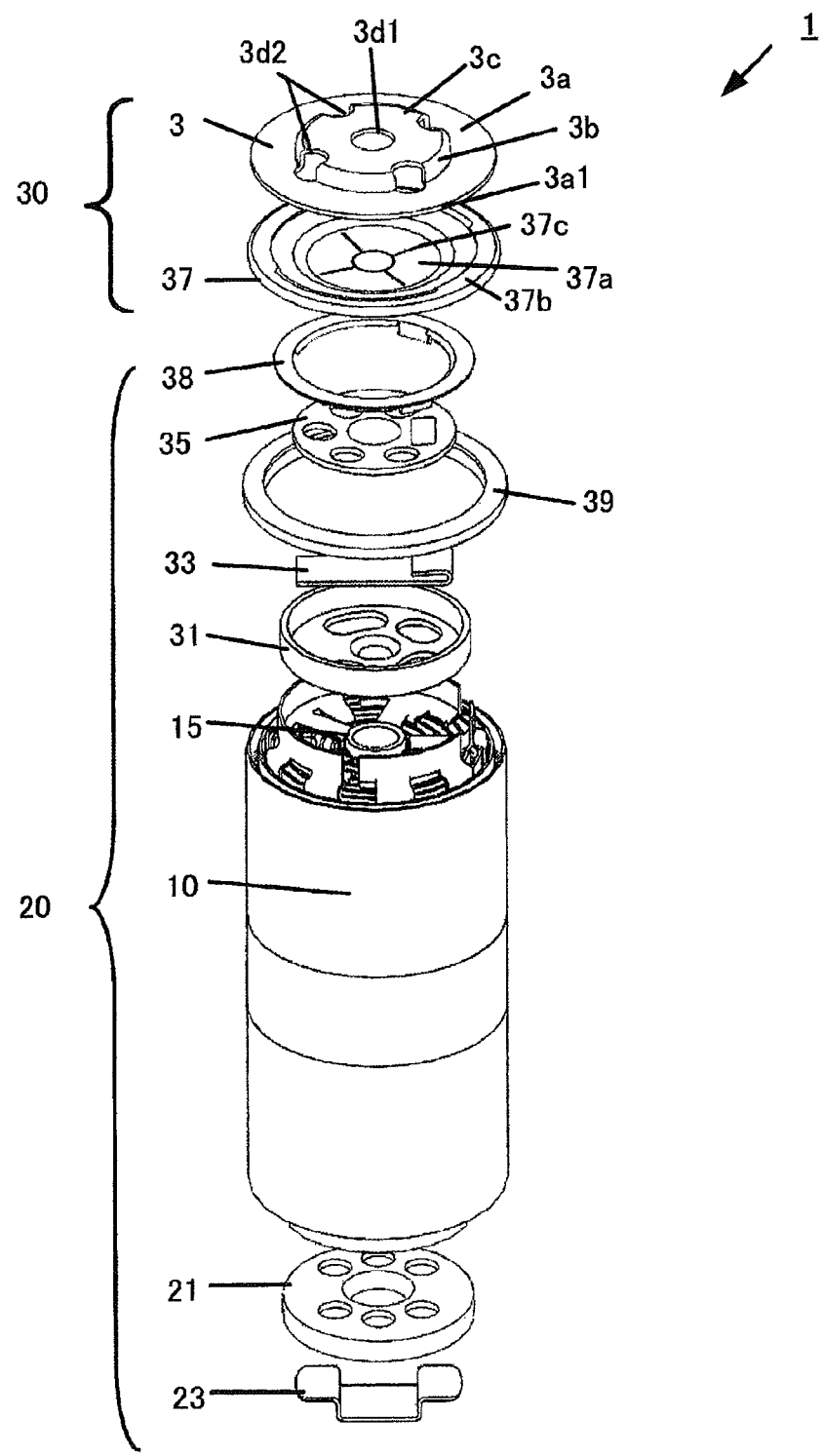
FIG. 2 is a decomposed perspective view of the secondary battery cell shown in FIG. 1.

FIG. 1 is an outer appearance perspective view of a lithium ion secondary battery cell as an embodiment of a welded structure in a battery according to the invention. FIG. 2 is a decomposed perspective view of the secondary battery cell shown in FIG. 1.

<Whole Structure>

A secondary battery cell (battery) 1 shown in FIG. 1 has structure and performance suitable for use in a hybrid electric vehicle, and has a cylindrical shape with a size of an outer shape of 40 mmφ and a height of 90 mm, and the rated capacity is 5 Ah.

The secondary battery cell 1 includes a battery container constructed of a battery case 2 in which a cylindrical power generation unit 20 shown in FIG. 2 is contained and a non-aqueous electrolyte (not shown) is injected and a battery cover unit 30. The battery case 2 is formed into a bottomed headless cylindrical shape having an opening at an upper (one end) side and is made of carbon steel having a thickness of 0.5 mm and provided with a nickel plating layer on inner and outer surfaces. The battery cover unit 30 is constructed such that a battery cover 3 and a cover case 37 are integrated, and is caulked to the battery case 2 to close the opening of the battery case 2. By this, the battery container sealed from the outside is formed.

<Power Generation Unit>

A winding group 10 is constructed such that a long positive electrode and a long negative electrode are wound through a separator around an outer periphery of an axial core 15 having a hollow cylindrical shape and made of, for example, polypropylene. The positive electrode of the winding group 10 is constructed such that a positive electrode mixture is coated on both surfaces of an aluminum-based metal foil on which positive tabs are arranged at equal intervals along one side edge in a longitudinal direction. The negative electrode is constructed such that a negative electrode mixture is coated on both surfaces of a copper-based metal foil on which negative tabs are arranged at equal intervals along the one side edge in the longitudinal direction. The positive electrode and the negative electrode are wound in a state in which the positive tabs and the negative tabs are arranged at sides facing each other.

A positive current collecting member 31 for collecting positive potential is arranged at the upper side of the winding group 10. The positive current collecting member 31 is made of aluminum-based metal and is connected to the positive electrode through the positive tabs. Joining of the positive tabs to the positive current collecting member 31 is performed by, for example, ultrasonic welding. A flexible positive conductive lead 33 constructed of plural laminated aluminum-based metal foils is provided on an upper surface of the positive current collecting member 31. One end part of the positive conductive lead 33 is joined to the positive current collecting member 31 by resistance welding or ultrasonic welding. The other end part of the positive conductive lead 33 is joined to a positive connection plate 35 by laser welding or the like.

The positive connection plate 35 is made of aluminum-based metal, and its outer periphery is held by an insulation ring 38 made of polypropylene.

A negative current collecting member 21 for collecting negative potential is arranged below the winding group 10. The negative current collecting member 21 is made of copper-based metal and is connected to the negative electrode through the negative tabs. Joining of the negative tab to the negative current collecting member 21 is performed by, for example, ultrasonic welding. A negative conductive lead 23 made of nickel is provided below the negative electrode. The negative conductive lead 23 is bent at the center part, and has a shape protruding from both ends toward the case bottom side of the battery case 2. Both the ends are joined to a lower surface of the negative current collecting member 21 by, for example, ultrasonic welding or spot welding.

The power generation unit 20 is constructed such that the winding group 10, the positive current collecting member 31, the positive conductive lead 33, the positive connection plate 35, the insulation ring 38, the negative current collecting member 21 and the negative conductive lead 23 are integrally joined to each other.

The power generation unit 20 is contained in the battery case 2, and is joined to the battery case 2 by resistance welding or the like in a state where the center part of the negative conductive lead 23 is pressed to the case bottom of the battery case 2. The joining of the negative conductive lead 23 to the case bottom of the battery case 2 by resistance welding is performed such that, for example, an electrode rod is inserted into a hollow part of the axial core 15, and the negative conductive lead 23 is pressed to the case bottom of the battery case 2 by the tip of the electrode rod.

The battery case 2 connected to the negative electrode of the winding group 10 through the negative conductive lead 23 and the negative current collecting member 21 is used as a negative output end.

After the power generation unit 20 is contained in the battery case 2, a predetermined amount of non-aqueous electrolyte is injected in the battery case 2.

As an example of the non-aqueous electrolyte, a solution in which a lithium salt is dissolved in a carbonate-based solvent can be used. Examples of the lithium salt include lithium hexafluorophosphate (LiPF6) and lithium tetrafluoroborate (LiBF4). Besides, examples of the carbonate-based solvent include ethylene carbonate (EC), dimethyl carbonate (DMC), diethyl carbonate (DEC), propylene carbonate (PC), methyethyl carbonate (MEC), and a mixture of solvents selected from the above solvents. In this embodiment, what is prepared by dissolving lithium hexafluorophosphate of 1 mol/liter as the electrolyte into a mixture solvent of EC, DMC and DEC is used as the non-aqueous electrolyte. The winding group 10 is infiltrated with the non-aqueous electrolyte.

<Battery Cover Unit>

In the state where the power generation unit 20 is contained in the battery case 2 and the predetermined amount of non-aqueous electrolyte is injected, the battery cover unit 30 is fixed to the peripheral edge part of the upper side opening part of the battery case 2 by caulking through a gasket 39. The gasket 39 is made of fluorine resin. Examples of a preferable material include PFA (polytetrafluoroethylene) and ETFE (ethylene tetrafluoroethylene).

Figure 3:
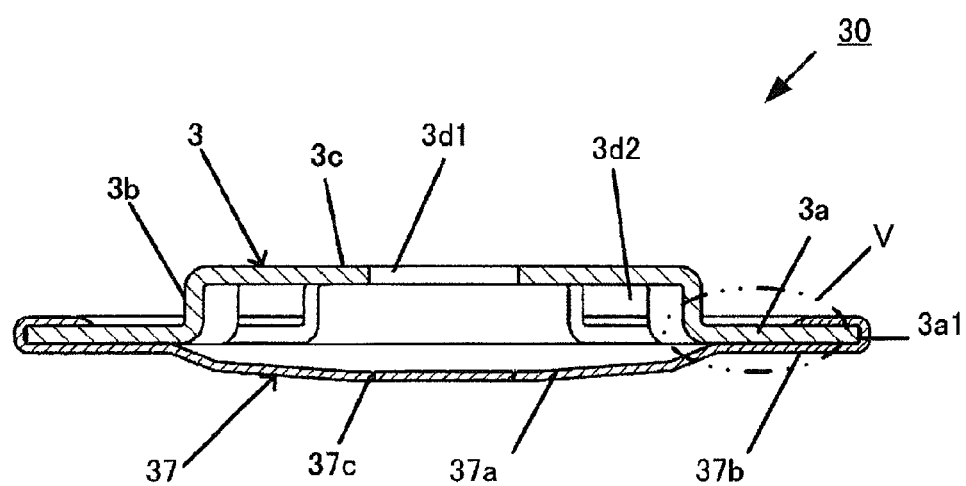
FIG. 3 is an enlarged sectional view of a battery cover unit shown in FIG. 2.
Figure 4:
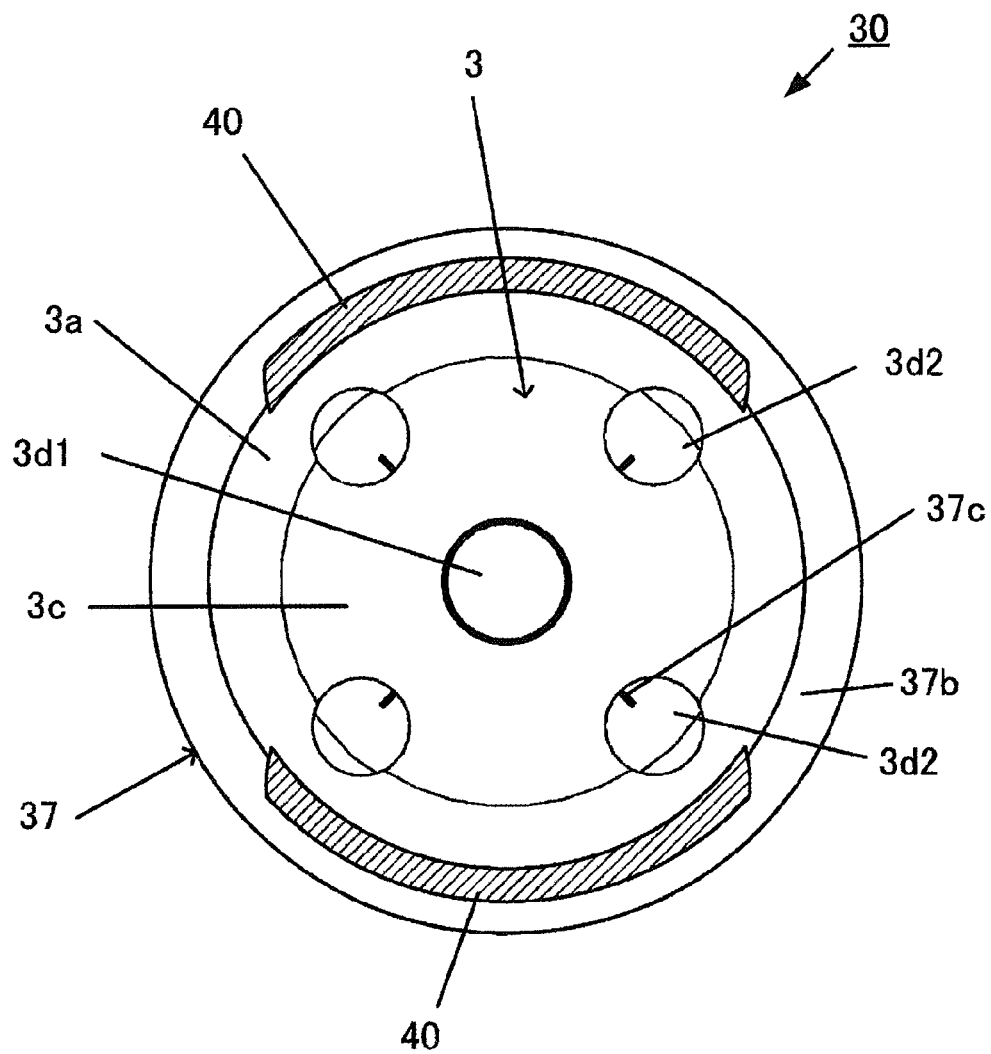
FIG. 4 is a plan view of the battery cover unit shown in FIG. 3.

FIG. 3 is an enlarged sectional view of the battery cover unit 30 shown in FIG. 2, and FIG. 4 is a plan view of the battery cover unit 30 shown in FIG. 3 and seen from above.

The battery cover unit 30 is constructed such that the battery cover (first conductive metal member) 3 and the cover case (second conductive metal member) 37 are integrated by caulking and are conducted to each other. Although not shown, the positive connection plate 35 is joined to the center of the cover case 37 by, for example, resistance welding or friction diffusion joining.

The battery cover 3 conductive to the cover case 37 is connected to the positive electrode of the winding group 10 through the positive connection plate 35, the positive conductive lead 33 and the positive current collecting member 31, and is used as the other output end of the secondary battery cell 1. The electric power stored in the winding group 10 can be taken out by the negative output terminal of the bottom surface of the battery case 2 and the positive output terminal of the upper surface of the battery 3.

The battery cover 3 is made of iron-based metal such as carbon steel, and a nickel plating layer (metal layer) 4 (see FIG. 5) is provided on the whole surface. The iron-based metal contains iron and iron alloy. The thickness of the plating layer 4 is, for example, 0.01 mm or less. The battery cover 3 is formed into a shape having a peripheral edge part 3a of a circular shape in plan view, a rising part 3b rising from the peripheral edge part 3a, and a head part 3c formed at the upper end of the rising part 3b. An exhaust port 3d1 is formed at the center of the head part 3c of the cylindrical part. Besides, plural exhaust ports 3d2 each straddling the peripheral edge part of the head part 3c and the rising part 3b are formed in the periphery of the cylindrical part.

The cover case 37 is made of aluminum-based metal and has a circular shape in plan view. The aluminum-based metal includes aluminum and aluminum alloy. The cover case 37 is arranged at the inner surface side of the battery cover 3, in other words, at the battery case 2 side. A peripheral edge part 37b thereof is bent at an outer peripheral side surface 3a1 and is folded from the inner surface side of the peripheral edge part 3a of the battery cover 3 to the outer surface side, and is caulked to the battery cover 3. A center region 37a of the cover case 37 is curved toward the battery case 2 side from the peripheral edge part 37b. In the center region 37a, a cleavage valve 37c (see FIG. 2) having a section formed into a V-shaped groove shape is formed on the surface of the battery cover 3 at the cylindrical part side. The cleavage valve 37 has a function as a safety mechanism which cleaves and releases gas in order to secure safety against rising of inner pressure of the battery when the electrolyte is decomposed by overcharging or the like and the gas is generated.

The exhaust ports 3d1 and 3d2 formed in the battery cover 3 are formed to exhaust the mist-like gas discharged from the inside of the secondary battery cell 1 when the cleavage valve 37c cleaves.

(Welding Structure)

Figure 5:
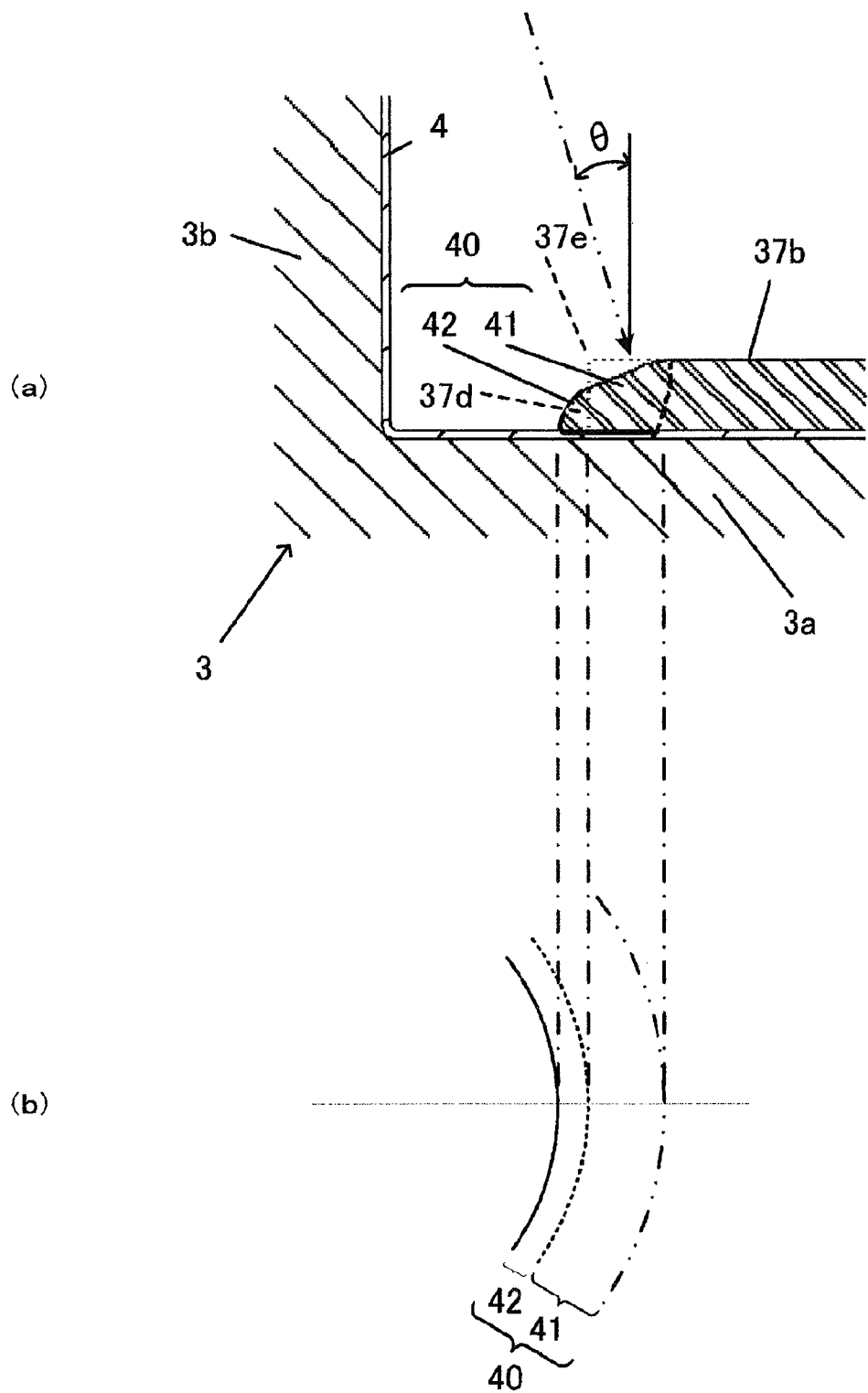
FIG. 5($a$) is an enlarged view of a region V of FIG. 3, and FIG. 5($b$) is a view in which a welded part in FIG. 5($a$) is seen from above.

FIG. 5(*a*) is an enlarged view of a region V of FIG. 3, and FIG. 5(*b*) is a view in which a welding part 40 in FIG. 5(*a*) is seen from above.

The cover case 37 caulked to the battery cover 3 is welded to the plating layer 4 at the welding part 40 of the tip part of the peripheral edge part 37b folded to the outer surface side of the battery cover 3. The plating layer 4 is made of nickel having higher joining force to iron-based metal by welding than that to aluminum-based metal.

In FIG. 5(*a*), a dotted line indicates the shape of the tip of the peripheral edge part 37b of the cover case 37 before the cover case 37 is welded to the plating layer 4. The welding part 40 includes a melted part 41 formed at the peripheral edge part of a tip 37d before welding, and an elution part 42 flowing to the outside from the tip 37d before welding. The melted part 41, the elution part 42 and the tip 37d before welding are formed into arc shapes as shown in FIG. 5(*b*).

The whole of the melted part 41 is thinner than the cover case 37 before welding, and has a shape inclined toward the tip 37d side before welding so as to become gradually thin. Besides, the elution part 42 is formed to be smoothly continuous with the melted part 41 at the tip 37d before welding, and has a shape inclined toward the tip part after welding so as to become gradually thin.

At the lower surfaces of the melted part 41 and the elution part 42 in contact with the plating layer 4, aluminum-based metal as the base material of the cover case 37 diffuses into the surface layer of the plating layer 4, and metal joining is performed. The joining depth of the melted part 41 and the elution part 42 to the plating layer 4 is limited only within the surface layer of the plating layer 4, does not extend over the whole plating layer 4, and does not reach the surface of the battery cover 3.

The plating layer 4 is annealed at the periphery of the welding part 40 as described later.

Since the whole of the melted part 41 and the elution part 42 is welded to the plating layer 4 in the surface of the plating layer 4 formed on the battery cover 3, the battery cover 3 as the iron-based metal member and the cover case 37 as the aluminum-based metal member are integrated by the welding structure having low electrical resistance, high joining force and high reliability.

Since the melted part 41 and the elution part 42 are metal-joined in the surface layer of the plating layer 4, the protection function of the plating layer 4 for the battery cover 3, such as corrosion resistance for the battery cover 3, is maintained. Besides, since the flowing distance of the elution part 42 on the plating layer 4 becomes large and the joining area increases, the joining force can be more increased. Further, since the plating layer 4 is annealed, the degree of adhesion between the battery cover 3 and the plating layer 4 is increased.

As shown in FIG. 4, the welding parts 40 are formed into arc shapes at two places along the peripheral edge part of the cover case 37. Each of the welding parts 40 is formed continuously from one end to the other end so that the one end corresponds to the position of one exhaust port 3d2 and the other end corresponds to the position of the adjacent exhaust port 3d2. Each of the welding parts 40 is formed in such a positional relation that the whole of the adjacent pair of exhaust ports 3d2 is included in the region thereof. Besides, the welding parts 40 at the two places are formed as a pair so as to be linearly symmetrical with respect to the center of the cover case 37.

(Forming Method of Welded Structure)

A method of forming the welded structure will be described.

As indicated by a two-dot chain line in FIG. 5, a laser is irradiated to the vicinity of a corner part 37e of the tip 37d of the cover case 37 before welding. The laser irradiation position is preferably located at, for example, a position inside the tip 37d by about 0.1 mm. When the laser irradiation position is separated from the tip 37d by 0.1 mm, and the tolerance of the distance from the tip 37d is ±0.1 mm, the center of the laser spot is not located outside the corner part 37e of the cover case 37.

In the laser irradiation, an output condition is set so that when the laser is irradiated to the tip part of the cover case 37 and the plating layer 4, the welding part 40 of the cover case 37 and the plating layer 4 are welded in the surface of the plating layer 4. If the laser output is excessively high, the plating layer 4 is melted over the whole layer thickness, and the protection function of the plating layer 4 for the battery cover 3, such as corrosion resistance, is impaired. In the case of the excessive irradiation, in visual inspection, the color of the plating layer 4 is changed and is seen to be blackish.

On the other hand, when only the surface layer of the plating layer 4 is melted and the welding part 40 is welded to the plating layer 4 in the surface of the plating layer 4, the protection function of the plating layer 4 for the battery cover 3, such as corrosion resistance, is maintained. As stated above, when the welding part 40 is welded in the surface of the plating layer 4, in visual inspection, the color change in the plating layer 4 is hardly seen.

When the welding state is accurately evaluated, although the use of analysis is more desirable, the observation of color change of the plating layer 4 by visual inspection is also useful for improvement of efficiency of the evaluation.

When the laser is irradiated to the tip part of the cover case 37 and the plating layer 4, the temperature of the plating layer 4 rises, and annealing process to reduce the distortion and stress in crystal is performed. Thus, the adhesion force between the battery cover 3 and the plating layer 4 increases.

An example of a welding condition is such that when the thickness of the peripheral edge part 37b of the cover case 37 is 0.4 mm, the spot diameter of the laser is 0.75 mm$\phi$. The laser irradiation angle $\theta$ is inclined toward the outside direction of the tip 37d from the surface parallel to the surface of the tip 37d of the cover case 37, and is desirably 20 degrees or less from the surface of the tip 37d, and is more preferably about 10 degrees.

When the inclination angle $\theta$ of laser irradiation is larger than 20 degrees, energy loss due to reflection from the battery cover 3 becomes large, and the melted part 41 becomes hard to flow to the tip side. When the inclination angle of laser irradiation becomes 0 degree or minus, a region in which the laser is directly irradiated to the plating layer 4 and a region which becomes a shadow of the peripheral edge part 37b and in which the laser is not irradiated to the plating layer 4 are formed, and fluctuation of irradiated energy density becomes large. Accordingly, the joining force becomes low.

In order to form the inclined laser welding part 40 of the laser continuously and in an arc shape, a method of scanning the laser while rotating the battery cover unit 30 is efficient.

Embodiment 2

Figure 6:
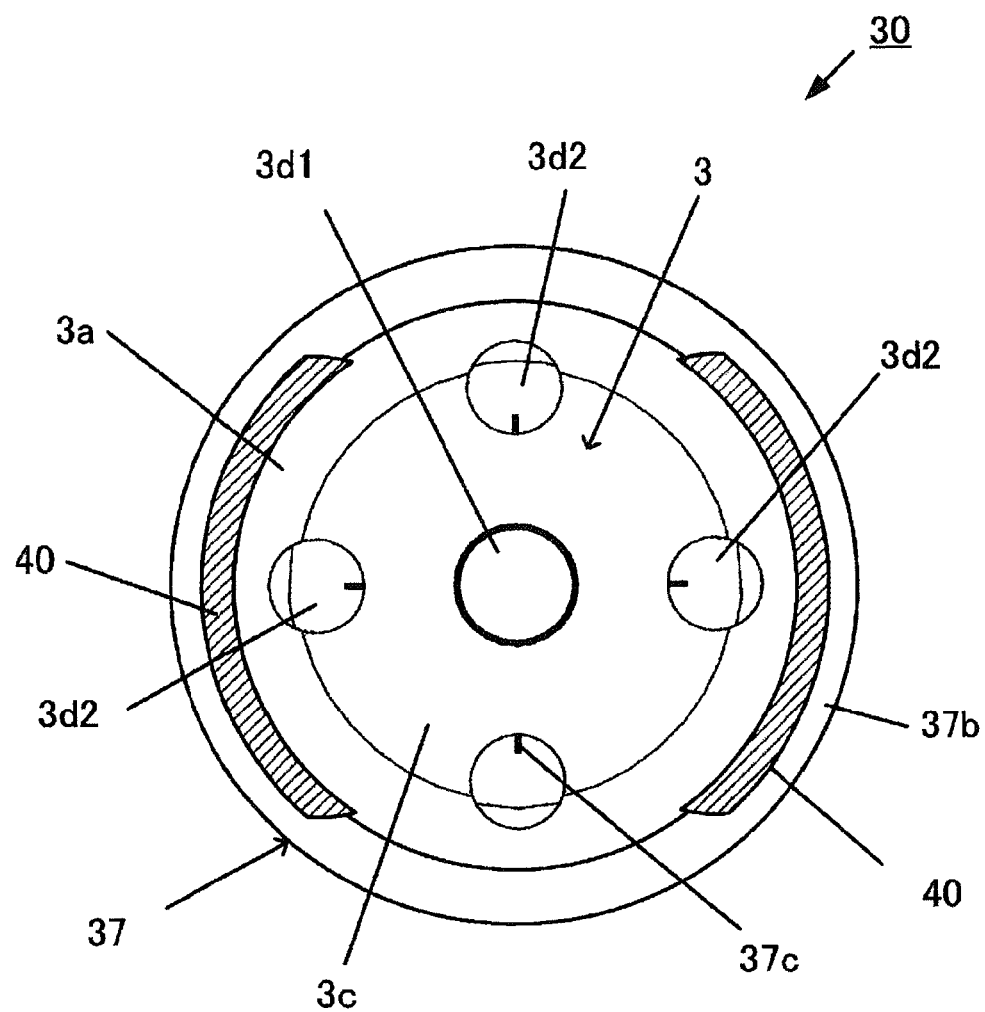
FIG. 6 is a plan view of a battery cover unit as an embodiment 2 of a welded structure in a battery according to the invention.

FIG. 6 is a plan view of a battery cover unit of embodiment 2 of a welded structure in a battery according to the invention.

A battery cover unit 30 of the embodiment 2 is different from that of the embodiment 1 shown in FIG. 4 in a positional relation between an exhaust port 3d2 and a welding part 40.

Also in the battery cover unit 30 of the embodiment 2, welding parts 40 are formed into arc shapes at two places along a peripheral edge part of a cover case 37 and are formed as a pair so as to be linearly symmetrical with respect to the center of the cover case 37. In the embodiment 1, the respective welding parts 40 are formed in such a positional relation that one end corresponds to the position of one exhaust port 3d2 and the other end corresponds to the position of the adjacent exhaust port 3d2, and the whole of the adjacent pair of exhaust ports 3d2 is included in the region.

On the other hand, in the embodiment 2, each of the welding parts 40 is such that both ends of one end and the other end are positioned at positions corresponding to middles of exhaust ports 3d2, and the one exhaust port 3d2 is arranged to correspond to the center part of each of the welding parts 40. Thus, the area of the welding part 40 in a region not corresponding to the exhaust ports 3d2 becomes large, the whole current path becomes short, and the electrical resistance between the battery cover 3 and the cover case 37 can be more decreased.

Incidentally, in the embodiments 1 and 2, although the structure is exemplified in which the four exhaust ports 3d2 are formed at an interval of 90 degrees, the number of the exhaust ports 3d2 and the positions can be suitably changed.

Besides, in the embodiments 1 and 2, the lengths and the number of the welding parts 40 are merely examples, and the lengths and the number of the welding parts 40 can be suitably changed. For example, the welding part 40 may be provided along the whole peripheral edge of the peripheral edge part 37b of the cover case 37, or plural welding parts may be provided in spots.

Embodiment 3

Figure 7:
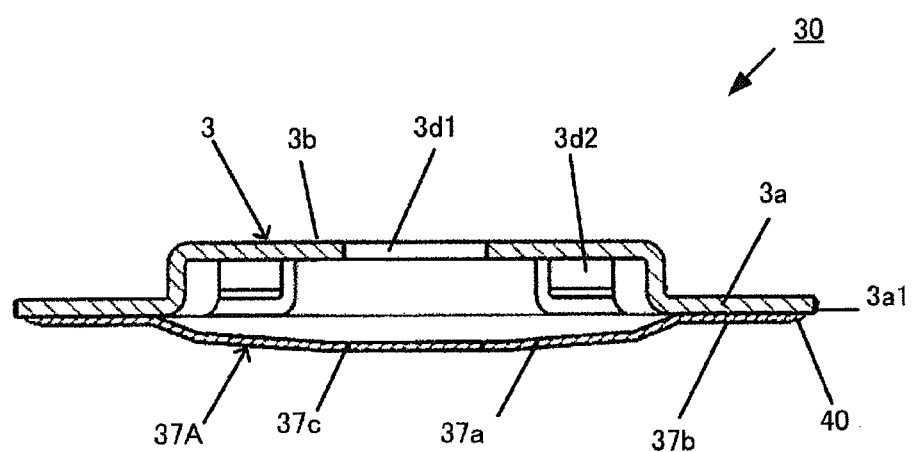
FIG. 7 is a sectional view of a battery cover unit as an embodiment 3 of a welded structure in a battery according to the invention.
Figure 8:
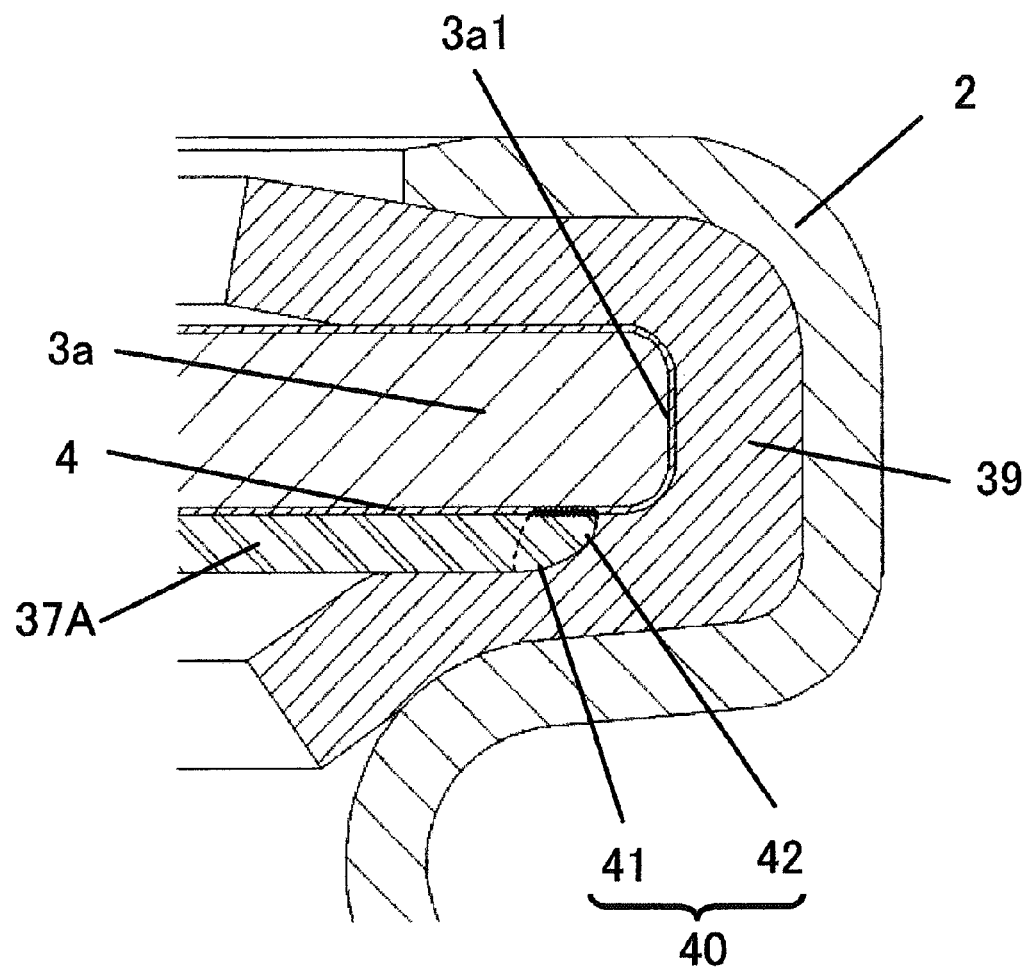
FIG. 8 is a main part enlarged sectional view of a state in which the battery cover unit shown in FIG. 7 is caulked to a battery case.

FIG. 7 is a sectional view of a battery cover unit as embodiment 3 of a welded structure in a battery according to the invention. FIG. 8 is a main part enlarged sectional view in a state where the battery cover unit shown in FIG. 7 is caulked to a battery case.

A battery cover unit 30 of embodiment 5 is different from that of the embodiment 1 shown in FIG. 3 in that a cover case 37A and a battery cover 3 are not caulked.

The cover case 37A is formed to have a diameter smaller than a diameter of the battery cover 3 in plan view, and a tip part of a welding part 40 of a peripheral edge part 37b is positioned inside a battery case 2 of a peripheral edge part 3a of the battery cover 3.

That is, as shown in FIG. 8, the cover case 37A is such that at the inner surface side of the peripheral edge part 3a of the battery cover 3, the welding part 40 is welded to a plating layer 4 formed on the battery cover 3. Also in the embodiment 3, the welding part 40 includes a melted part 41 and an elution part 42, and is welded to the plating layer 4 in the surface.

The battery cover 3 and the cover case 37 integrated at the welding part 40 is caulked to an opening part peripheral edge provided at the upper end part of the battery case 2 through a gasket 39. In FIG. 8, the gasket 39 covers the welding part 40 provided at the peripheral edge part of the cover case 37, an inner surface of the peripheral edge part 3a of the battery cover 3, an outer peripheral side surface 3a1 and an outer surface of the peripheral edge part 3a; and is compressed by the battery cover 3 and the cover case 37.

Other components are the same as the embodiment 1, and the corresponding components are denoted by the same reference numerals and the description thereof is omitted.

Embodiment 4

Figure 9:
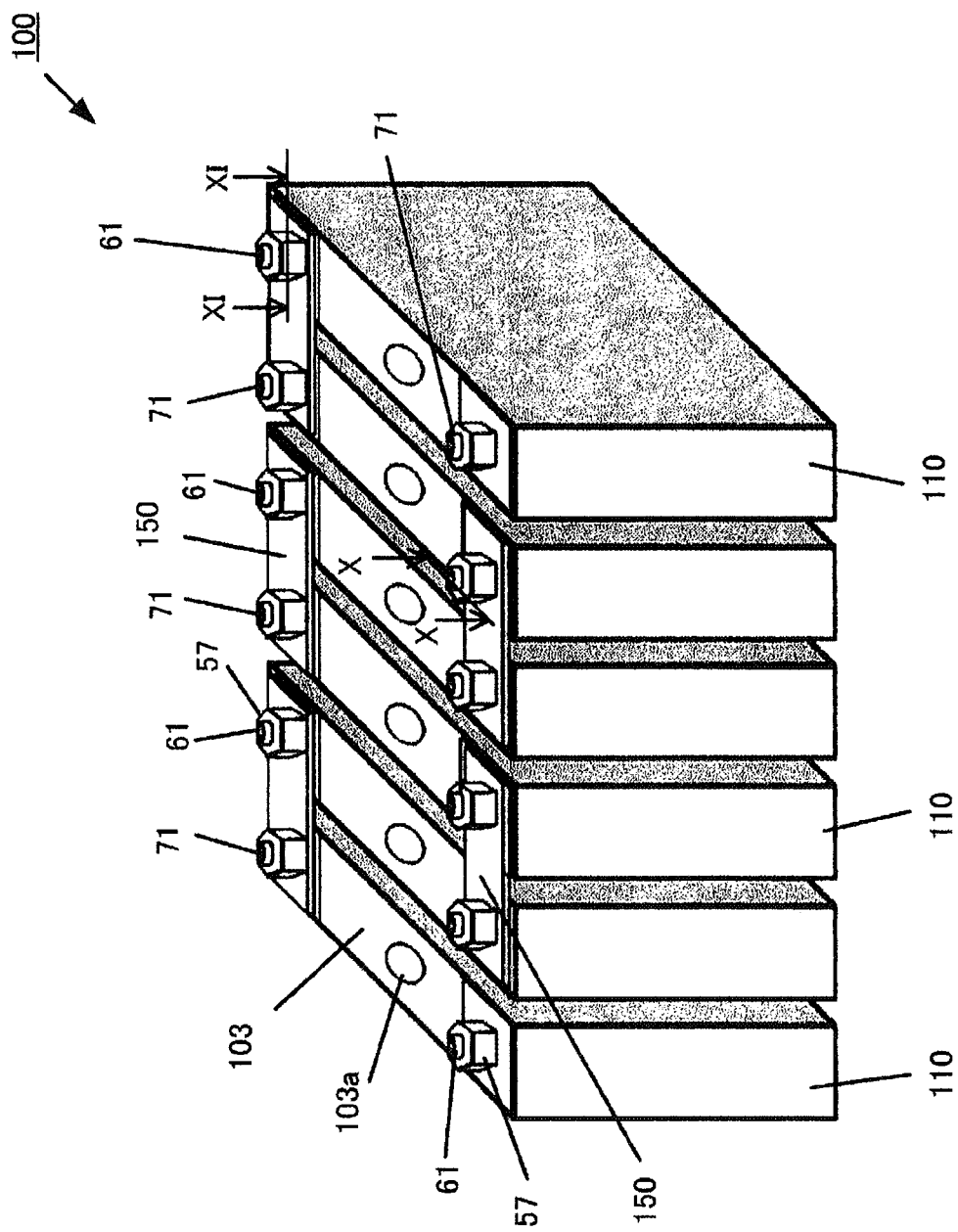
FIG. 9 is an outer appearance perspective view of a secondary battery module as an embodiment 4 of a welded structure in a battery according to the invention.
Figure 10:
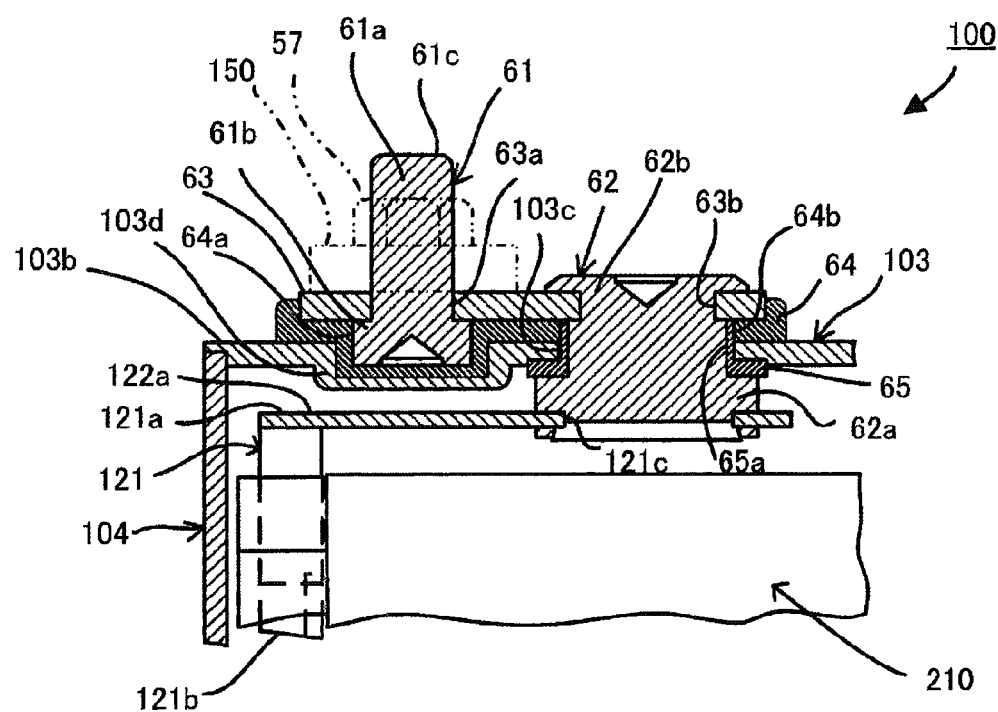
FIG. 10 is a X-X line sectional view of the secondary battery module shown in FIG. 9.
Figure 11:
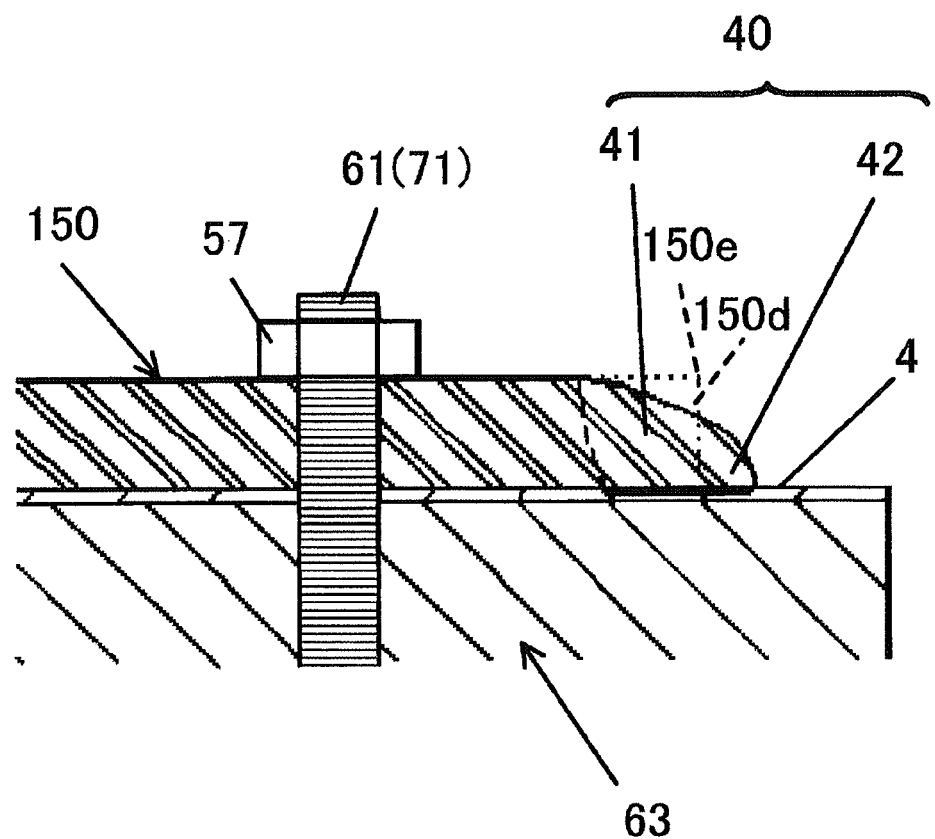
FIG. 11 is a XI-XI line enlarged sectional view of the secondary battery module shown in FIG. 9.

FIG. 9 to FIG. 11 show embodiment 4 of a welded structure in a battery according to the invention.

FIG. 9 is an outer appearance perspective view of a secondary battery module.

A secondary battery module (battery) 100 is formed by assembling plural prismatic secondary battery cells 110, and has a structure suitable for, for example, a hybrid vehicle. The respective secondary battery cells 110 are, for example, lithium ion secondary batteries, and are alternately reversely arranged so that an outer positive terminal 61 and an outer negative terminal 71 face each other with respect to the adjacent secondary battery cells 110.

Incidentally, in the specification, the term "battery" has a broad sense including the secondary battery cell 1 and the secondary battery module 100.

The outer positive terminal 61 and the outer negative terminal 71 of the adjacent secondary battery cells 110 are electrically connected by a bus bar 150, and the entire secondary battery cells 110 are connected in series. The bus bar 150 is inserted through the outer positive terminal 61 and the outer negative terminal 71, are fastened by nuts 57 and are attached to a battery cover (first conductive metal member) 103. The outer positive terminal 61 of the secondary battery cell 110 arranged at one end side and the outer negative terminal 71 of the secondary battery cell 110 arranged at the other end side are connected to an outer device by a not-shown connection member, and discharge current is supplied from the secondary battery module 100 to the outer device. A cleavage valve 103a is formed between the outer positive terminal 61 and the outer negative terminal 71 on an upper part of each of the secondary battery cells 110.

FIG. 10 is a X-X line sectional view of the secondary battery module shown in FIG. 9.

The secondary battery cell 110 includes a winding group 210 as a power generation body, a battery case 104 containing the winding group 210, a battery cover 103 for sealing an open end of the battery case 104, a positive terminal structure provided in the battery cover 103, and a positive current collecting plate 121 for electrically connecting the positive terminal structure and a positive electrode of the winding group 210. Besides, although not shown in FIG. 10, the secondary battery cell 110 includes also a negative terminal structure provided in the battery cover 103 and a negative current collecting body for electrically connecting the negative terminal structure and a negative electrode of the winding group 210.

When the secondary battery cell 110 is manufactured, a cover assembly is manufactured by caulking and fixing a positive connection terminal 62 of the positive terminal structure integrated with the battery cover 103 to the positive current collecting body 121, and the cover assembly is welded to the winding group 210 through the positive current collecting body 121, so that a power generation unit assembly is manufactured.

The power generation unit assembly is contained in the battery case 104, the battery cover 103 is laser-welded to the open end part of the battery case 104 to seal the inside of the battery case, non-aqueous electrolyte is filled into the inside of the battery case through an injection port of the battery cover 103, and the injection port is sealed with a cover, so that the secondary battery cell 110 is manufactured.

A peripheral edge part 103b of the battery cover 103 is thin, and the peripheral edge part 103b is joined to the battery case 104 by, for example, laser welding in a state where the peripheral edge part is fitted to a peripheral edge part of an upper opening part of the battery case 104, so that the battery container with a sealing structure to the outside is formed. The battery cover 103 is made of iron-based metal or the like.

At the positive electrode side, the positive terminal structure is constructed in which the outer positive terminal 61, the positive connection terminal 62, a positive terminal plate (electrode terminal member) 63, an insulation plate 64, a gasket 65 and the positive current collecting plate 121 are attached to the battery cover 103.

The outer positive terminal 61, the positive connection terminal 62, the positive terminal plate 63 and the positive current collecting plate 121 are formed of conductive metal members of aluminum-based metal or the like.

Incidentally, in FIG. 10, the bus bar (second conductive metal member) 150 and the nut 57 are shown by two-dot chain lines.

Opening parts 63a and 63b are formed in the positive terminal plate 63. The outer positive terminal 61 has a bolt structure including a terminal part 61a and a base part 61b, and a male screw is formed on the outer periphery of the terminal part 61a. The terminal part 61a of the outer positive terminal 61 is inserted in an opening part 64a of the insulation plate 64 and the opening part 63a of the positive terminal plate 63. The base part 61b of the outer positive terminal 61 is inserted in the opening part 64a of the insulation plate 64, and is sandwiched between the positive terminal plate 63 and a stepped part 103d of the battery cover 103.

The gasket 65 is formed into a stepped ring shape including an opening part 65a. The gasket 65 is inserted in an opening part 103c of the battery cover 103. The positive connection terminal 62 is formed into a stepped cylindrical shape having a lower tube part 62a with a large diameter and an upper tube part 62b with a small diameter. The upper tube part 62b of the positive connection terminal 62 is inserted in the opening part 65a of the gasket 65 and the opening part 63b of the positive terminal plate 63. The positive terminal plate 63 is caulked by the upper tube part 62b of the positive connection terminal 62, and, together with the positive terminal plate 63, is fixed to the battery cover 103.

As described above, the positive connection terminal 62 of the positive terminal structure integrated with the battery cover 103 is caulked and fixed to the positive current collecting body 121, and the cover assembly is manufactured by this. Hereinafter, the positive terminal structure will be described in detail. The positive terminal structure in this specification is a structure in which the positive current collecting body 121 is removed from the cover assembly, and connects the positive current collecting plate 121 to the positive outer terminal 61.

The positive terminal structure as described above is manufactured as described below.

A lower end of the positive connection terminal 62 is inserted into an opening 121c of the positive current collecting plate 121. The gasket 65 is mounted to the lower tube part 62a of the positive connection terminal 62 through the opening part 65a, the battery cover 103 is mounted to the gasket 65 through the opening 103c, and the insulation plate 64 is covered on the battery cover 103. At this time, the insulation plate 64 is fitted in the concave part of the stepped part 103d of the battery cover 103, and an opening part 64b of the insulation plate 64 is fitted in the gasket 65.

The base part 61b of the positive outer terminal 61 is fitted in the concave part of the insulation plate 64, and the positive terminal plate 63 is fitted in the positive outer terminal 61 through the opening part 63*a*. At this time, the positive terminal plate 63 is mounted to the upper tube part 62*b* of the positive connection terminal 62 through the opening part 63*b*. The positive connection terminal 62 is caulked and deformed from the upper and lower end surfaces, so that the positive current collecting plate 121 is caulked to the lower tube part 62*a* at the lower end, and the positive terminal plate 63 is caulked and fixed to the upper tube part 62*b* at the upper end. By this, the positive terminal structure is manufactured.

Although not shown, at the negative electrode side, the negative terminal structure is attached to the battery cover 103.

The negative terminal structure has basically the same structure as the positive terminal structure. However, the outer negative terminal, a negative connection terminal, a negative terminal plate (electrode terminal member) and a negative current collecting plate of the negative terminal structure are made of copper-based metal. In the above, the outer negative terminal, the negative connection terminal, the negative terminal plate and the negative current collecting plate are members respectively corresponding to the outer positive terminal 61, the positive connection terminal 62, the positive terminal plate 63 and the positive current collecting plate 121 of the positive terminal structure.

The terminal structure on the negative electrode side is the same as the positive terminal structure except for the above, and the assembling method is also the same, and accordingly, a description thereof is omitted.

Each of the bus bars 150 is formed of aluminum-based metal or copper-based metal into a rectangular flat plate shape. In each of the bus bars 10, a pair of side surfaces parallel to a longitudinal direction thereof, one end surface (front end surface) perpendicular to the side surface and the other end surface (rear end surface) are welded to the plate layer (metal layer) 4 of the positive terminal plate 63 provided on the battery cover 103 of the secondary battery cell 110. The aluminum-based metal includes aluminum and aluminum alloy. The copper-based metal includes copper and copper alloy.

FIG. 11 is a XI-XI line enlarged sectional view of the secondary battery module shown in FIG. 9.

The nickel plating layer 4 is formed on the upper surface of the positive terminal plate 63. The bus bar 150 is arranged on the plating layer 4. As described above, the bus bar 150 is inserted through the outer positive terminal 61 and the outer negative terminal 71, is fastened by the nut 57 and is fixed to the battery cover 103.

Incidentally, similarly to FIG. 5, a dotted line in FIG. 11 indicates the shape of a tip of the bus bar 150 before the bus bar 150 is welded to the plating layer 4, 150*d* denotes the tip of the bus bar 150 before welding, and 150*e* denotes a tip corner part of the bus bar 150 before welding.

A welding part 40 is formed at the tip side of the bus bar 150, and the welding part 40 is welded to the plating layer 4. The welding part 40 includes a melted part 41 and an elution part 42, and is metal-joined to the plating layer 4 in the surface of the plating layer 4. That is, at the outer positive terminal 61 side, the aluminum-based metal in the lower surface is diffused into the surface of the plating layer 4, and the melted part 41 and the elution part 42 are metal-joined to the surface of the plating layer 4. Besides, at the outer negative terminal 71 side, the copper-based metal in the lower surface is diffused into the surface of the plating layer 4, and the melted part 41 and the elution part 42 are metal-joined to the surface of the plating layer 4. The depth of the metal joining is only the surface layer of the plating layer 4 at both the outer positive terminal 61 side and the outer negative terminal 71 side, and does not extended over the entire plating layer 4, and does not reach the surface of the positive terminal plate 63. Besides, the plating layer 4 is subjected to an annealing process by laser irradiation when the welding part 40 is formed.

Although not shown, at the negative electrode side, the welding part 40 provided at the tip side of the bus bar 150 is welded to the plating layer 4 formed on the surface of the negative terminal plate. The welding part 40 of the negative terminal plate is welded to the plating layer 4 in the surface of the plating layer 4, and the welding structure is the same as the welding structure of the positive terminal plate 63 and the plating layer 4 except that the negative terminal plate is made of copper-based metal.

As described above, according to the respective embodiments of the invention, the following effects are obtained.

(1) There are provided the battery cover 3 exemplified in the embodiments or the positive terminal plate 63, the first conductive metal member constituting the negative terminal plate, the metal layer formed of the plating layer 4 provided on the first conductive metal member, and the second conductive metal member constituting the cover case 37 exemplified in the embodiments or the bus bar 150, the melted part 41 in which the tip is melted and the elution part 42 flowing from the tip onto the metal layer are formed at the tip side of the second conductive metal member, and the melted part 41 and the elution part 42 are welded to the metal layer in the surface of the metal layer.

Thus, the welding structure having low electrical resistance, high joining force and high reliability can be obtained.

(2) Since the melted part 41 and the elution part 42 are metal-joined in the surface layer of the plating layer 4, the protection function of the plating layer 4 for the battery cover 3, such as corrosion resistance for the battery cover 3, can be maintained after the welding.

(3) Since the melted part 41 and the elution part 42 are metal-joined in the surface layer of the plating layer 4, the distance in which the elution part 42 flows on the plating layer 4 becomes large, and the joining area increases, and therefore, the joining force can be further increased.

(4) Since the plating layer 4 is annealed simultaneously with the welding, the degree of adhesion between the battery cover 3 and the plating layer 4 is improved.

Incidentally, in the above embodiments, the iron-based metal is exemplified as the material of the first conductive metal member.

However, as the material of the first conductive metal member, another metal such as copper or copper alloy can be used in addition to the iron-based metal.

The aluminum-based metal or copper-based metal is exemplified as the material of the second conductive metal member. However, the material of the first conductive metal member is not limited to this, and another metal such as, for example, tin or tin alloy can be used.

In the respective embodiments, nickel is exemplified as the material of the metal layer forming the plating layer 4. However, as the material of the metal layer, another metal such as tin or tin alloy can be used in addition to nickel.

In the respective embodiments, the metal layer is exemplified as the plating layer 4 formed by plating. However, the metal layer may be a clad member in which for example, metal such as nickel or tin is diffused in iron-based metal or copper-based metal.

In the embodiments, the joining between the battery cover 3 and the cover case 37 or the joining between the bus bar 150 and the positive terminal plate 63 or the negative terminal plate is exemplified. However, the invention can be applied also to joining between other conductive metal members, and can be widely applied to a welding structure of conductive metal members forming a current path in a battery.

In the embodiments, the terminal structure at the secondary battery module positive electrode side and the negative electrode side is exemplified as the structure including the outer positive/negative terminal, the positive/negative connection terminal, the positive/negative terminal plate, the positive/negative current collecting plate, the insulation plate 64 and the gasket 65. However, the terminal structure at the positive side and the negative side is not limited to this structure, and any structure may be adopted as long as the positive/negative electrode terminal member is attached to the battery cover 103 through the insulation member. The bus bar 150 is not limited to the structure in which it is fixed by the bolt structure, and may have such a structure that it is fixed to the positive/negative electrode terminal member by fitting, arc welding or the like.

In the embodiments, although the secondary battery cell for the hybrid electric vehicle and the secondary battery module are exemplified, the invention is not limited to this, and can be applied also to a portable and small consumer lithium ion secondary battery cell.

Besides, the invention is not limited to the lithium ion secondary battery cell, and can be applied to a secondary battery using aqueous electrolyte, such as a nickel-hydrogen battery, a nickel-cadmium battery or a lead storage battery.

In addition, the invention can be variously modified and applied, within the scope of the gist of the invention, and in short can be applied to anything as long as a metal layer is provided on one metal member of first and second conductive metal members made of different materials, and a melted part and an elution part formed at least a part of the tip part of the other metal member are welded to the metal layer in the surface of the metal layer.

The invention claimed is:

1. A method of forming a welded structure in a battery, comprising:
    arranging a second conductive member, made of a second material different from that of a first material of a first conductive metal member, on a surface of a metal plating layer which is formed on a surface of the first conductive metal member, the second conductive metal member extending a first length along the surface of a metal plating layer from an outer periphery of the first conductive metal member to a tip portion of the second conductive metal member having a shape defined by (i) a top surface extending a portion of the first length and (ii) an edge extending a tip height from the metal plating layer to the top surface;
    controlling an output of laser light irradiated to the second conductive metal member to:
        irradiate the second conductive metal member at a position inside the tip portion and form a melted part of the tip portion of the second conductive member and an elution part of the tip portion of the second conductive member which flows from the tip portion onto the surface of the metal plating layer: and
        after forming the melted part and the elution part by the irradiation, simultaneously weld the melted part and the elution part to the metal plating layer and anneal the metal plating layer such that the melted part and the elution part are welded to the metal plating layer at a depth below the surface of the metal plating layer which does not reach the surface of the first conductive metal member.

2. The method of forming the welded structure according to claim 1, wherein the metal plating layer is made of a third material different than the first material and the second material, and
    the melted part and the elution part are welded to the metal plating layer at a depth below the surface of the metal plating layer which does not reach the surface of the first conductive metal member via a first joining force of the metal plating layer to the first conductive metal member being higher than a second joining force of the metal plating layer to the second conductive metal member.

3. The method of forming the welded structure according to claim 1, wherein (i) the laser light irradiated to the second conductive member and (ii) a line intersecting the top surface of the tip portion of second conductive member and parallel to the edge of the second conductive member define an irradiation angle of 20 degrees or less.

4. The method of forming the welded structure according to claim 3, wherein the irradiation angle is about 10 degrees.

5. The method of forming the welded structure according to claim 1, wherein the irradiating further comprises irradiating the second conductive metal member such that the melted part decreases in height as the melted part extends to the elution part and the elution part extends past the location of the edge of the tip portion relative to the outer periphery of the first conductive metal member.

* * * * *